UNITED STATES PATENT OFFICE.

JAMES EMERSON REYNOLDS AND GEORGE RUDOLF GRUBB, OF DUBLIN, IRELAND.

PRODUCTION OF FILMS ON PLATE-GLASS OR OTHER TRANSPARENT BODIES.

SPECIFICATION forming part of Letters Patent No. 722,901, dated March 17, 1903.

Application filed September 30, 1901. Serial No. 77,140. (No model.)

*To all whom it may concern:*

Be it known that we, JAMES EMERSON REYNOLDS and GEORGE RUDOLF GRUBB, subjects of the King of Great Britain and Ireland, residing at Dublin, Ireland, have invented an Improved Production of Films on Plate-Glass or other Transparent Bodies, of which the following is a specification.

Layers or films having lustrous surfaces have been produced on glass and other substances by applying to the surface to be coated a solution containing dissolved lead, with or without other metals in solution, and a body capable of affording sulfur by gradual decomposition in the liquid; but such layers or films, besides being opaque or translucent, have not been of a uniform and amorphous character, such as is essential to the regular reflection and transmission of light.

Now this invention has for its object the production on transparent bodies, such as plate-glass, glass prisms, lenses, and other shaped pieces of glass, or on other transparent bodies, such as pieces of what are known in optics as "pebbles," of practically uniform amorphous transparent films, such as will efficiently serve the twofold purpose of reflecting and transmitting light-rays, whereby transparent bodies of different forms coated with such films can be used for viewing objects near or at a distance, while at the same time a large amount of light can be reflected from the coated surfaces of such bodies and they can be adapted to serve various useful purposes with great advantage. For this purpose, according to the present invention, the desired film is produced by immersing the material to be coated in a solution of thio-urea, (a definite chemical compound discovered by one of us—namely, the said James Emerson Reynolds—and described in the *Journal of the Chemical Society of London*, Vol. 7, Second Series,) to which solution has been added a separate solution in caustic soda of well-washed freshly-precipitated lead tartrate, heating this mixture, adding a further quantity of lead-tartrate solution, lowering the temperature of the mixture under treatment, and allowing the whole to gradually cool, the material under treatment being during the cooling process usually at a slightly-higher temperature than the mixture, which is advantageous.

In carrying out the invention the two solutions, which we will call for distinction, respectively, "Solution A" and "Solution B," are prepared as follows:

Solution A is prepared by dissolving thio-urea in distilled water, suitable proportions being fifteen (15) grams of thio-urea to one liter of distilled water.

Solution B is prepared by dissolving well-washed freshly-precipitated lead tartrate in an aqueous solution of caustic soda, suitable proportions being seventy-five (75) grams of the freshly-precipitated well-washed lead tartrate, dissolved in a solution of caustic soda in distilled water containing forty (40) grams of pure caustic soda, (NaOH,) the whole being then made up to one liter.

The precipitate of the requisite amount of lead tartrate can conveniently be prepared by adding to the calculated weight of Rochelle salt in solution a sufficient weight of lead acetate or nitrate also in solution to completely precipitate the possible amount of lead tartrate from the salts. Before being dissolved in the caustic-soda solution the freshly-precipitated lead tartarate is, while still wet, carefully and repeatedly washed in distilled water by decantation or otherwise, and after the thus-thoroughly-washed lead tartrate has been dissolved in the caustic-soda solution the resulting liquid is kept in an efficiently-closed vessel, such as a well-stoppered bottle.

In order to produce a transparent film of the character referred to on the material to be coated, a mixture is prepared on the basis of the following proportions—that is to say, four volumes of Solution A are mixed with six volumes of distilled water, and to this mixture there is added of Solution B a volume equal to from one-fortieth to one-fiftieth, or thereabout, of the total volume of Solution A. The body to be coated, which we will assume to be of glass and which must be scrupulously clean, is immersed in the mixture produced as last above described, and the mixture and the body under treatment within the mixture are gradually raised to and kept at a temperature of, say, 140° Fahrenheit until the solution assumes a dark sherry color. At this stage a further two volumes of Solution B (cold) are added, and the vessel containing the heated solution in which the glass to be coated is still immersed is immediately placed in a water-bath, the temperature of which is, say, 120° Fahrenheit, in order to effect the deposition on the glass of the requisite film of lead sulfid in the desired condition.

The water-bath should preferably be of such capacity as to allow the temperature of the water in it to fall from, say, 120° to 110° Fahrenheit in about fifteen minutes.

The transparent body should be kept in a state of motion throughout the period during which it is immersed in the solution.

In practice the body whereof a surface or surfaces is or are to be coated is wholly immersed in the liquid, and during the cooling process its temperature remains, as aforesaid, slightly in excess of the temperature of the gradually-cooling liquid. It will be understood that the entire surface of the immersed piece of glass or other body becomes coated. From those portions of the surface of the body where the coating is not required it can be readily removed by the application of any suitable solvent—such, for example, as hydrochloric acid.

What we claim is—

1. The hereinabove-described process of producing a film on a transparent body, said process consisting in immersing the body to be coated in a solution of thio-urea to which has been added a separate solution in caustic alkali of well-washed freshly-precipitated lead tartrate.

2. The hereinabove-described process of producing a film on a transparent body, said process consisting in subjecting the body to be coated to the action of a heated solution of thio-urea to which has been added a separate solution in caustic alkali of well-washed freshly-precipitated lead tartrate.

3. The hereinabove-described process of producing a film on a transparent body, said process consisting in immersing the body to be coated in a solution of thio-urea to which has been added a separate solution in caustic alkali of well-washed freshly-precipitated lead tartrate, heating this mixture and adding thereto a further quantity of lead-tartrate solution.

4. The hereinabove-described process of producing a film on a transparent body, said process consisting in immersing the body to be coated in a solution of thio-urea to which has been added a separate solution in caustic alkali of well-washed freshly-precipitated lead tartrate, heating this mixture, adding thereto a further quantity of lead-tartrate solution, and lowering the temperature of said mixture.

5. The hereinabove-described process of producing a film on a transparent body, said process consisting in immersing the body to be coated in a solution of thio-urea to which has been added a separate solution in caustic alkali of well-washed freshly-precipitated lead tartrate, heating this mixture, adding thereto a further quantity of lead-tartrate solution, lowering the temperature of the mixture and allowing the whole to cool gradually while keeping the temperature of the body under treatment slightly higher than that of the liquid in which it is immersed.

6. The hereinabove-described process of coating a transparent body, said process consisting in immersing the body in a film-forming liquid consisting of a mixture of a solution prepared by dissolving about fifteen grams of thio-urea in one liter of distilled water, and adding distilled water thereto in the proportion of six volumes of distilled water to four volumes of the solution, and of a solution prepared by dissolving about seventy-five grams of well-washed freshly-precipitated lead tartrate in an aqueous solution of about forty grams of pure caustic soda, and making up to one liter, the second solution being added to the first in the proportion of from one-fortieth to one-fiftieth part of the total volume of the first solution.

7. The hereinabove-described process of forming a film on a transparent body, said process consisting in immersing the body in a liquid consisting of a mixture of a solution prepared by dissolving about fifteen grams of thio-urea in one liter of distilled water, and adding distilled water thereto in the proportion of six volumes of distilled water to four volumes of the solution, and of a solution prepared by dissolving about seventy-five grams of well-washed freshly-precipitated lead tartrate in an aqueous solution of about forty grams of pure caustic soda, and making up to one liter, the second solution being added to the first in the proportion of from one-fortieth to one-fiftieth part of the total volume of the first solution, gradually raising the temperature of the mixture and of the body under treatment therein to about 140° Fahrenheit, keeping the whole at about the same temperature until the liquid assumes a dark sherry color, adding a further quantity, in the cold, of the second solution, placing the vessel containing the liquid and the transparent body in a bath having a temperature of about 120° Fahrenheit, and allowing the whole to cool to about 110° Fahrenheit.

8. The hereinabove-described process of forming a film on a transparent body, said process consisting in immersing the body in a liquid consisting of a mixture of a solution prepared by dissolving about fifteen grams of thio-urea in one liter of distilled water, and adding distilled water thereto in the proportion of six volumes of distilled water to four volumes of the solution, and of a solution prepared by dissolving about seventy-five grams of well-washed freshly-precipitated lead tartrate in an aqueous solution of about forty grams of pure caustic soda, and making up to one liter, the second solution being added to the first in the proportion of from one-fortieth to one-fiftieth part of the total volume of the first solution, gradually raising the temperature of the mixture and of the body under treatment therein to about 140° Fahrenheit, keeping the whole at about the same temperature until the liquid assumes a dark sherry color, adding gradually a further quantity, in the cold, of the second solution, placing the vessel containing the liquid and the transparent body in a bath having a temperature of about 120° Fahrenheit, and allowing the whole to cool to about 110° Fahrenheit.

9. The hereinabove-described process of producing a film on a transparent body, said process consisting in immersing the body to be coated in a solution of thio-urea to which has been added a separate solution in caustic alkali of well-washed freshly-precipitated lead tartrate, and maintaining said body in a state of motion during the formation thereon of the film.

Signed at Dublin this 18th day of September, 1901.

JAMES EMERSON REYNOLDS.
    GEORGE RUDOLF GRUBB.

Witnesses:
    ROMNEY R. GRUBB,
    C. W. POOLEY.